United States Patent
Johansson et al.

(10) Patent No.: US 8,903,420 B2
(45) Date of Patent: Dec. 2, 2014

(54) LOCATION FOR MINIMIZATION OF DRIVE TEST IN LTE SYSTEMS

(71) Applicant: Mediatek, Inc., Hsin-Chu (TW)

(72) Inventors: Per Johan Mikael Johansson, Kungsangen (SE); Yih-Shen Chen, Hsinchu (TW)

(73) Assignee: Mediatek Inc. (TW)

( * ) Notice: Subject to any disclaimer, the term of this patent is extended or adjusted under 35 U.S.C. 154(b) by 0 days.

(21) Appl. No.: 13/633,463

(22) Filed: Oct. 2, 2012

(65) Prior Publication Data

US 2013/0084888 A1 Apr. 4, 2013

Related U.S. Application Data

(60) Provisional application No. 61/542,410, filed on Oct. 3, 2011.

(51) Int. Cl.
 *H04M 11/04* (2006.01)
 *H04W 24/08* (2009.01)
 *H04W 64/00* (2009.01)

(52) U.S. Cl.
 CPC .............. *H04W 24/08* (2013.01); *H04W 64/00* (2013.01)
 USPC .................................... 455/456.1; 455/404.2

(58) Field of Classification Search
 CPC ..... H04W 24/10; H04W 24/08; H04W 64/00; H04W 4/021; H04B 17/0072; H04M 2242/30; H04M 3/42348
 USPC ............. 455/67.11, 456, 418, 404.1; 342/450
 See application file for complete search history.

(56) References Cited

U.S. PATENT DOCUMENTS

| 2011/0201279 A1* | 8/2011 | Suzuki et al. .............. 455/67.11 |
| 2012/0120810 A1 | 5/2012 | Wang et al. .................. 370/242 |
| 2012/0135754 A1* | 5/2012 | Wu et al. .................... 455/456.2 |
| 2012/0142328 A1* | 6/2012 | Awoniyi et al. ............... 455/418 |
| 2013/0122914 A1* | 5/2013 | Fukuta .......................... 455/440 |

FOREIGN PATENT DOCUMENTS

| CN | 1531365 A | 9/2004 |
| CN | 102006621 A | 11/2010 |
| CN | 102056216 A | 5/2011 |
| EP | 2360961 A2 | 2/2010 |

(Continued)

OTHER PUBLICATIONS

The European Patent Office has prepared the Search Report of EP application 12006882 dated Jan. 17, 2013 (8 pages).

(Continued)

*Primary Examiner* — Nizar Sivji
(74) *Attorney, Agent, or Firm* — Zheng Jin

(57) ABSTRACT

A method and apparatus for active location acquisition. An active location acquisition controller is included in a device. The active location acquisition controller can be a circuit or code running on a processor included in the device. A measurement collection request is communicated to the device. The device then determines if and how a location information is to be acquired. If the device determines that the location information is to be acquired, the device enables a location acquisition system to acquire the location information and the device then acquires the requested measurement and stores the requested measurement and the location information in the measurement log. If the device determines that the location information is not to be acquired, the device disables a location acquisition system and does not acquire the location information and the device then acquires the requested measurement and stores the requested measurement in the measurement log.

16 Claims, 9 Drawing Sheets

FLOWCHART OF UE LOGGED MDT INFORMATION

(56) References Cited

FOREIGN PATENT DOCUMENTS

| GB | 2487090 A | 1/2011 |
| WO | WO2011126014 A1 | 4/2010 |
| WO | WO2012063671 A1 | 11/2010 |
| WO | WO2011012085 A1 | 2/2011 |

OTHER PUBLICATIONS

3GPP TSG-RAN WG2 #70bis, Huawei, "MDT Location Control and Correlation", Stockholm, Sweden, Jun. 28-Jul. 2, 2010 (Paragraph 1; paragraph 2.1, lines 1 to 13; paragraph 2.2 and 3*).

International Search Report and Written Opinion of International Search Authority for PCT/CN2012/082557 dated Jan. 10, 2013 (10 pages).

* cited by examiner

USER EQUIPMENT WITH ACTIVE LOCATION ACQUISITION CONTROL

BASE STATION WITH ACTIVE LOCATION ACQUISITION CONTROL

USER PLANE LOCATION SUBSYSTEM WITH
BASE STATION MDT LOGGING

UE LOCAL STAND ALONE LOCATION SUBSYSTEM
WITH BASE STATION MDT LOGGING

CONTROL PLANE LOCATION SUBSYSTEM
WITH UE MDT LOGGING

FLOWCHART OF UE LOGGED MDT INFORMATION

FLOWCHART OF UE LOGGED MDT INFORMATION

LOCATION FOR MINIMIZATION OF DRIVE TEST IN LTE SYSTEMS

CROSS REFERENCE TO RELATED APPLICATIONS

This application claims priority under 35 U.S.C. §119 from U.S. Provisional Application No. 61/542,410, entitled "Locating for MDT LTE System," filed on Oct. 3, 2011, the subject matter of which is incorporated herein by reference.

TECHNICAL FIELD

The disclosed embodiments of the present invention relate generally to wireless communication technology and, more particularly, relate to a method and apparatus for acquiring location information related to Minimization of Drive Test (MDT) measurements.

BACKGROUND

The modern era of communications has brought about an enormous expansion of wireline and wireless networks. Computer networks, television networks, and telephony networks are experiencing an unprecedented technological expansion, fueled by consumer demands, while providing more flexibility and immediacy for information transfer.

Current and future networking technologies continue to facilitate ease of information transfer and convenience, telecommunication industry service providers are developing improvements to existing networks. For example, the evolved universal mobile telecommunications system (UMTS) terrestrial radio access network (E-UTRAN) is currently being developed. The E-UTRAN, which is also known as Long Term Evolution (LTE), is aimed at upgrading prior technologies by improving efficiency, lowering costs, improving services, making use of new spectrum opportunities, and providing better integration with other open standards.

One advantage of E-UTRAN which continues to be shared with other preceding telecommunication standards is the fact that users are enabled to access a network employing such standards while remaining mobile. Thus, for example, users having mobile terminals equipped to communicate in accordance with such standards may travel vast distances while maintaining communication with the network. By providing access to users while enabling user mobility, services are available to users while the users remain mobile. However, the mobility of users requires the network to provide continuity of service to the mobile users by enabling a user's mobile terminal to be handed over between different serving stations within corresponding different cells or service areas. To verify and test radio network deployment and operation, drive tests have been conducted in the past. Drive testing typically involved the use of specific measurement tools that could be driven or carried through an area to collect data for network operation verification. Thus, manual testing and verification of radio network operation has been common.

For existing and especially for newer networks (e.g. LTE and future networks), it may be desirable to reduce the need for drive testing or walk testing to reduce manual testing of networks and therefore reduce operational costs. Accordingly, studies regarding support for minimization of drive tests (MDT) are currently popular which aim to utilize commercial terminals for reporting of relevant measurement results in order to avoid separate manual testing with special test equipment and involvement of operator personnel.

Although the current invention is not limited to the context of MDT, MDT is deemed to be the closest current art. MDT feature enables UEs to perform Operations, Administration, and Maintenance (OAM) activities, such as neighborhood detection, measurements, logging and recording for OAM purposes, which includes radio resource management (RRM) and optimization purposes. There are two types of MDT. For immediate MDT, measurements are performed by the UEs in CONNECTED state for E-UTRA and for Cell_DCH state in UTRA. The collected information is either measured directly in the network or measured in the UE and reported to the network immediately as it becomes available. For logged MDT, measurements are performed and logged by the UEs in IDLE state and in Cell_PCH and URA_PCH state for UTRA. The UEs may report the collected and logged information to the network at a later point of time.

The UE collected measurement information (also referred to as event information) during MDT, in general, may contain location information of the user, or may contain data from which location of the user can be estimated. For example, RAN logs of immediate MDT, logs of logged MDT, and logs of problem events such as Radio Link Failure, may all contain location information or data from which location can be estimated. Acquisition of location information does not come without a burden. Location acquisition methods may consume UE power to operate UE location acquisition circuitry or to perform additional communications to determine location information. Nevertheless, the location information related to a MDT event information is often highly valuable. For example, the ability to determine that many radio link failures are occurring in a small area of a network cell can allow localized corrective actions that allow quality of service in the small area to be improved. MDT thus creates a need for an efficient and active location acquisition control scheme governing if and how location information related to MDT measurements is acquired in various networks. In the current art, such a location acquisition control scheme does not exist. In current art, MDT control and location acquisition control features are independent, and in particular for LTE, where location control and MDT control is performed by different network nodes, eNB vs. e-SMLC, the current signaling and control support is insufficient. Furthermore, in the present document the term active location is used meaning location actively performed for the specific purpose of MDT regardless of resource consumption impact, e.g. UE power and battery consumption. The resource consumption and UE battery impact of active location is comparable to positioning hardware being turned on for the purpose of MDT. The alternative to active location is best effort or passive location, where MDT only uses location information anyway available for other purpose, which is covered by prior art. While best effort location has the benefit of low resource consumption, it comes with the drawback of delivering location information not often enough for efficient MDT.

It is the objective of the current invention to address the shortcomings in current art. It is desirable to provide a solution that fulfills the new system requirements related to managing access to event information, such as MDT measurement and Radio Link Failure, with maximum simplicity and minimum impact to the current system.

SUMMARY

A method and apparatus for active location acquisition is provided. In one novel aspect, an active location acquisition controller is included in a User Equipment (UE). The active location acquisition controller can be a circuit or code running on a processor included in the UE. A measurement collection request is communicated to the UE. In the present document, measurement collection includes measurement logging and may include measurement initiation. Together with the measurement collection request, location information may also be requested to be actively provided. The UE then determines if, when and how a location information is to be acquired. If the UE determines that the location information is to be acquired at a certain point in time, the UE enables a location acquisition system to acquire the location information. The UE then acquires the requested measurement and stores the requested measurement and the location information in the measurement log.

In a second novel aspect, an active location acquisition controller is included in a User Equipment (UE). The active location acquisition controller can be a circuit or code running on a processor included in the UE. A measurement collection request maybe with a request to actively provide location, is communicated to the UE. The UE then determines if, when and how a location information is to be acquired. If the UE determines that the location information is not to be acquired at a certain point in time, the UE disables a location acquisition system for a period of time and does not acquire the location information. The UE then acquires the requested measurement and stores the requested measurement in the measurement log.

In a third novel aspect, an active location acquisition controller is included in a base station (BS). The base station may be an Evolved Node B (eNB) base station. The active location acquisition controller can be a circuit or code running on a processor included in the base station. A measurement collection request, maybe with a request to actively provide location, is communicated to the base station. The base station then determines if, when and how a location information is to be acquired. If the base station determines that the location information is to be acquired at a certain point in time, the base station enables a location acquisition system to acquire the location information. The base station then acquires the requested measurement and stores the requested measurement and the location information in the measurement log.

In a fourth novel aspect, an active location acquisition controller is included in a base station (BS). The base station may be an Evolved Node B (eNB) base station. The active location acquisition controller can be a circuit or code running on a processor included in the base station. A measurement collection request is communicated to the base station. The base station then determines if, when and how a location information is to be acquired. If the base station determines that the location information is not to be acquired at a certain point in time, the base station disables a location acquisition for a period of time. The base station then acquires the requested measurement and stores the requested measurement in the measurement log.

In a fifth novel aspect, a computer readable medium has code for communicating a measurement collection request maybe with a request to actively provide location onto a device, determining if, when and how a location information is to be acquired, acquiring the requested measurement, and storing the requested measurement in a measurement log, wherein the acquiring and storing are performed by the device.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
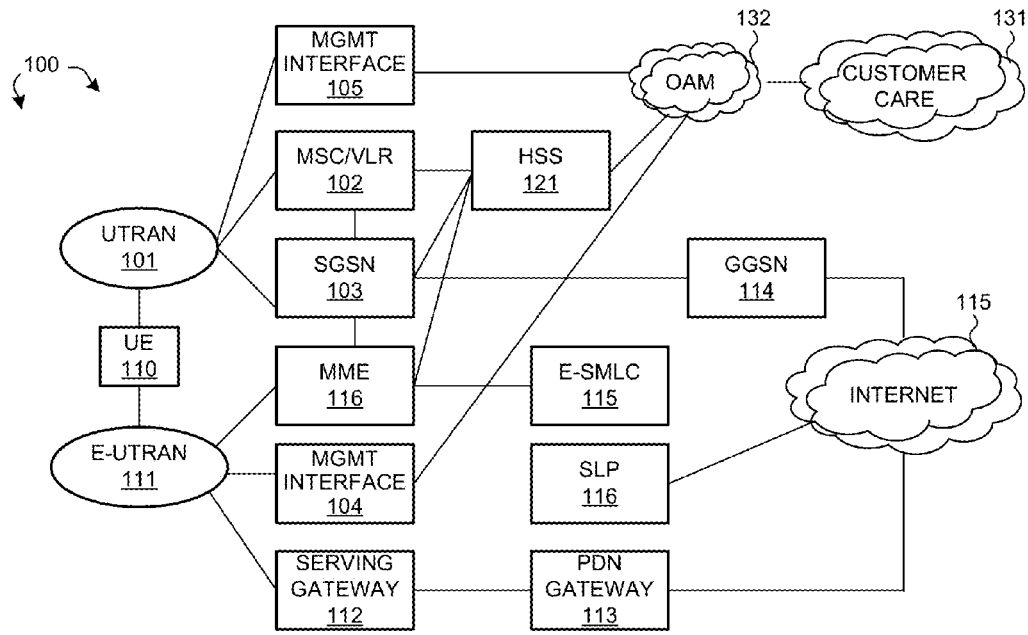
FIG. 1 illustrates 3GPP system architecture.

FIG. 1 illustrates a 3GPP system architecture in accordance with one novel aspect. 3GPP system 100 comprises an UTRAN radio access network 101, a Mobile Switching Centre or a visitor location register (MSC/VLR) 102, a serving GPRS (general packet radio service) support node (SGSN) 103, a user equipment UE 110, an E-UTRAN radio access network 111, a serving gateway S-GW 112, a packet data network (PDN) gateway PDN-GW 113, a policy control and routing function (PCRF) 114, operator's IP services (e.g., the Internet) 115, a home subscriber server (HSS) 121, a customer care center 131, and an Operation, Administration, and Maintenance (OAM) system 132. In the example of FIG. 1, E-UTRAN 111 provides a new air interface for cellular services to UE 110 via OFDMA (Orthogonal Frequency Division Multiple Access) technology. E-UTRAN 111 may also provide IP services to UE 110 through S-GW 112 and P-GW 113. On the other hand, UTRAN 101 is an UMTS radio access network that provides connectivity between UEs and the network via W-CDMA (Wideband Code Division Multiple Access) technology. In 3GPP LTE systems, HSS 121, S-GW 112, and PDN-GW 113, eSMLC 115 and other nodes (not shown) form an evolved packet core network, while the evolved packet core network and E-UTRAN 111 together form a public land mobile network (PLMN). In 3GPP UTRA systems, HSS 121, MSC 102, SGSN 103, and other nodes (not shown) form a core network. UTRAN 101 and the core network together form a public land mobile network (PLMN). Standardized by Open mobile Alliance (OMA), by Secure User Plane Location (SUPL) the SLP server provides location services for UEs connected by any Access Technology. While E-UTRAN and UTRAN radio access networks are described above, one skilled in the art will appreciated that other radio access networks may be improved by the present invention. A few of these radio access networks are High Speed Downlink Packet Access (HSDPA) network, a High Speed Uplink Packet Access (HSUPA) network, a Code Division Multiple Access (CDMA) network, Self Organizing Network (SON), or an Orthogonal Frequency Division Multiple Access (OFDMA) radio access network.

3GPP introduces new features to help LTE and UTRA system operators to further optimize network planning in a cost-effective way. Minimization of Drive Test (MDT) is one of the features where UEs collect measurements and report measurement information to their serving eNBs and serving RNCs. MDT feature enables UEs to perform Operations, Administration, and Maintenance (OAM) activities, such as neighborhood detection, measurements, logging and recording for OAM purposes, which includes radio resource management (RRM) and optimization purposes. There are two types of MDT. For immediate MDT, measurements are performed by the UEs in connected state for E-UTRA and for cell DCH state for UTRA. The collected information is either measured in the network or measured in the UE and reported to the network immediately when available, by RRM procedures such as measurement reports. For logged MDT, measurements are performed and logged by the UEs in IDLE state, and also for cell_PCH and URA_PCH states for UTRA. The UEs may report the collected information to the network at a later point of time.

The UE collected measurement information (also referred to as event information), in general, may contain MDT measurement information, radio measurements, logs of broadcast communication failure information, logs of multicast communication failure information, logs of Random Access Channel (RACH) performance, and logs of communication problems including Radio Link Failure, Handover Failure, and Radio Resource Control (RRC) Connection Establishment Failure. For example, RAN logs of immediate MDT, logs of logged MDT, and logs of problem events such as Radio Link Failure, may all contain location and velocity information or data from which location and velocity can be estimated. MDT thus creates a need for an efficient and automatic management scheme for governing how the UE collecting event information shares the collected event information with various radio access networks. In the current art, such a management scheme does not exist.

Figure 2:
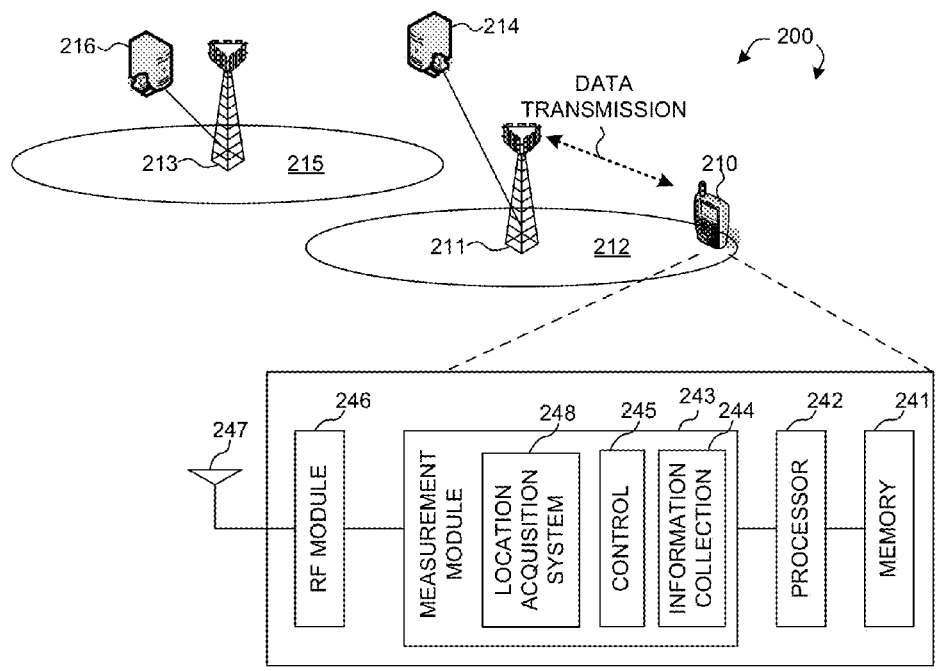
FIG. 2 illustrates a UE including a measurement module within a network.

FIG. 2 illustrates an exemplary method and apparatus for collecting and accessing measurement information (i.e. event information) in a mobile network 200. Mobile network 200 comprises a UE 210, an EUTRAN cell 212, and a UTRAN cell 215. The E-UTRAN cell 212 has an eNodeB 211 and a Radio Access Network (RAN) control node 214. The UTRAN cell 215 has a NodeB 213 and a Radio Access Network (RAN) control node 216. Using 3GPP LTE system as an example, UE 210 subscribes cellular and IP services via E-UTRAN cell 212, and is served by the serving eNodeB 211. UE 210 comprises memory 241, a processor 242, an event measurement module 243 including an information collection module 244 (e.g., measures and records measurement information), a control module 245 (e.g., determines if and how location information is acquired and determines if the measurement information is transmitted to the RAN controller 214), and a radio frequency (RF) module 246 coupled to an antenna 247. The UE may also contain a UE stand alone location acquisition system 248, that makes it possible for the UE to determine its location. The contents of UE 210 provide the ability for the UE to collect measurement information (information collection module 244) and store the measurement information and location information in memory 241 (a storage device) within the UE. The components of the UE 210 also provide the ability for the UE to determine whether (control module 245) to communicate (processor 242, RF module 246 and antenna 247) the collected measurement information with a Radio Access Network (RAN).

The different modules are function modules that may be implemented by software, firmware, hardware, or any combination thereof. The function modules, when executed by the processor, allow UE 210 to perform measurement information collection and reporting of measurement information and location information to the RAN controller 214. Similarly, for 3GPP UTRA system, UTRAN cell 215 provides services to users.

Figure 3:
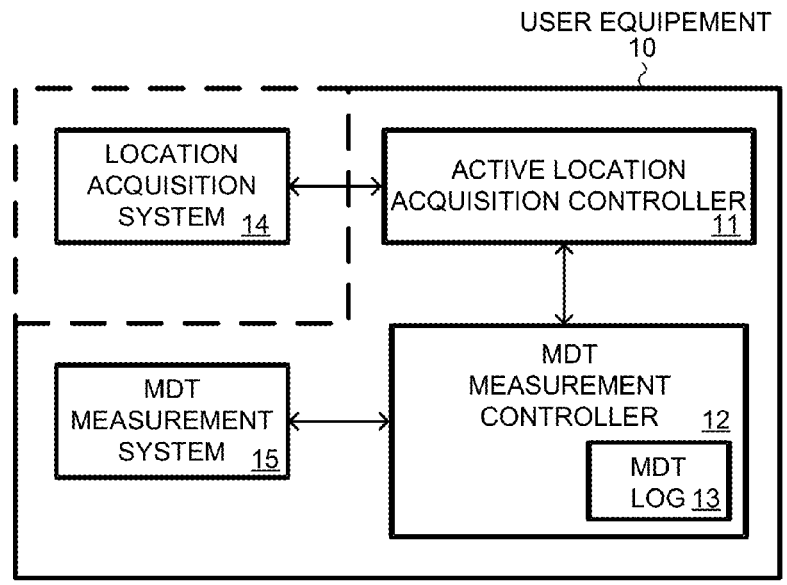
FIG. 3 is a diagram of a UE with active location acquisition control.

FIG. 3 is a diagram of a UE 10 with active location acquisition control. UE 10 comprises an active location acquisition controller 11, a Minimization of Drive Test (MDT) controller 12, a MDT log 13, and a MDT measurement system 15. In one embodiment, the UE 10 further comprises a location acquisition system 14. In another embodiment, the location acquisition system 14 is located outside of the UE 10. This variation in UE configuration is illustrated by use of dashed line shown in FIG. 3. The active location acquisition controller 11 determines if location information is to be acquired at certain points in time. The active location acquisition controller 11 also determines how the location information is to be acquired. If so determined, the active location acquisition controller 11 sends instruction to location acquisition system 14 and subsequently receives location information from location acquisition system 14. Active location acquisition controller 11 then communicates the location information to MDT measurement controller 12. MDT measurement controller 12 sends instructions to MDT measurement system 15 and subsequently receives measurement information from MDT measurement system 15. MDT measurement controller 12 then stores both the measurement information and the location information in MDT log 13. Co-locating in the UE for logged MDT both the active location acquisition controller and the MDT measurement controller that does the MDT logging allows location acquisition to be dependent on MDT measurement logging and its state, avoiding unnecessary location acquisition and the related resource consumption when it is not needed.

Figure 4:
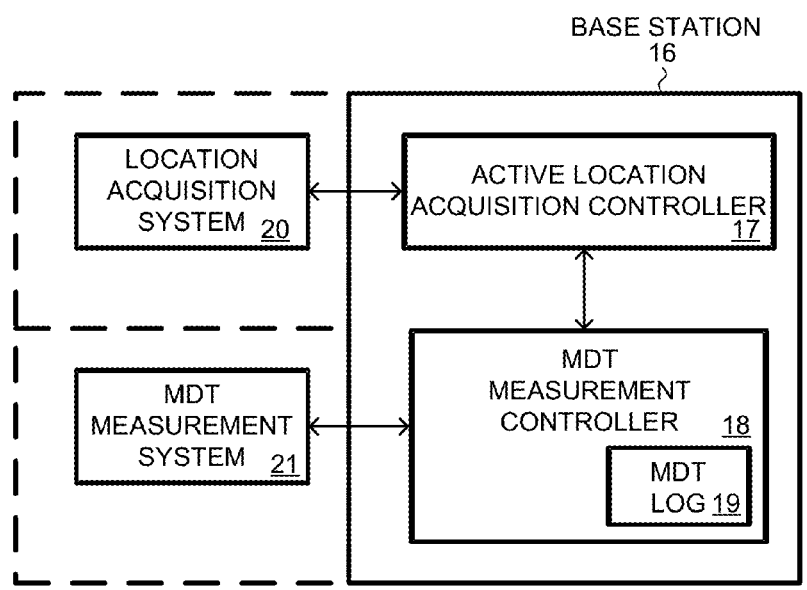
FIG. 4 is a diagram of a base station with active location acquisition control.

FIG. 4 is a diagram of a base station 16 with active location acquisition control. Base station 16 comprises an active location acquisition controller 17, a Minimization of Drive Test (MDT) controller 18, a MDT log 19. In one embodiment, the base station 16 further comprises a location acquisition system 20. In another embodiment, the location acquisition system 20 is located outside of the base station 16. In another embodiment, the base station 16 further comprises MDT measurement system 21. In yet another embodiment, the MDT measurement system 21 is located outside of the base station 16. This variation in base station configuration is illustrated by use of dashed line shown in FIG. 4. The active location acquisition controller 17 determines if location information is to be acquired at a certain point in time. The active location acquisition controller 17 also determines how the location information is to be acquired. If so determined, the active location acquisition controller 17 sends instruction to location acquisition system 20 and subsequently receives location information from location acquisition system 20. Active location acquisition controller 17 then communicates the location information to MDT measurement controller 18. MDT measurement controller 18 sends instructions to MDT measurement system 21 and subsequently receives measurement information from MDT measurement system 21. MDT measurement controller 18 then stores both the measurement information and the location information in MDT log 19.

Active location acquisition controller 11, 17 can be implemented in either hardware or software. In one embodiment, Active location acquisition controller 11, 17 could be implemented as a hardware state machine. In another embodiment, active location acquisition controller 11, 17 could be computer readable medium that has code for determining if and how to acquire location information.

Location acquisition system 14, 20 may be an array of location acquisition systems. In one embodiment the location acquisition system is located in the UE and is a Global Navigation Satellite System (GNSS). In another embodiment location acquisition system is an Observed Time Difference of Arrival (OTDOA) system. Other location acquisition systems are cell identification systems, based on 3GPP cells, Wifi Cells or other short range cells, enhanced cell identification based positioning systems, and UE sensor based positioning systems. Reusing standardized frameworks for positioning, the following systems could also be regarded location acquisition systems: a) Control plane Location subsystem (CP LCS)—standardized by 3GPP controlled by the eSMLC server, b) User Plane Location Subsystem (UP LCS) aka SUPL standardized by OMA (and partly be 3GPP) controlled by the SLP server. A Location Client can ask for UE location using such system, and the eSMLC or SLP will select appropriate positioning method and deliver the UE location information. Note that UP LCS and CP LCS can be used in an alternative manner and could additionally be regarded as support system to another location acquisition system, providing only assistance data, e.g. for UE based GNSS positioning or for UE based OTDOA positioning.

Cell identification is the simplest of all location acquisition systems, however only provides a rough estimate of the current location because only the serving cell (base station) where the UE is located is provided.

Enhanced cell identification based systems improve location accuracy by use of other UE or E-UTRAN measurements to estimate the UE position. The measurement used may be radio resource measurement or other measurements. Enhanced Cell ID measurements can be invoked by the eNB and are not very resource consuming. In one embodiment enhanced cell location acquisition system is used as a backup to UE based location acquisition system, in case the UE based location acquisition system cannot deliver location results, e.g. due to GNSS being out of coverage.

Network assisted GNSS systems provide various assistance data to the UE that is equipped with radio receivers capable of receiving GNSS signals. The UE uses the assistance data provided by the network to help acquire location information quickly. Examples of GNSS include: Global Positioning System (GPS), Modernized GPS, Galileo, GLONASS, Space Based Augmentation Systems (SBAS) and Quasi Zenith Satellite System (QZSS). Different GNSS can be used separately or in combination to determine the position of a UE.

The OTDOA system is a downlink terrestrial system. The UE performs measurements of downlink signals of neighbor E-UTRAN cells. This system provides a good back up method for determining location information when satellite signals are not strong enough (e.g. indoors or bad atmospheric conditions). The UE receives the downlink radio transmission of four or more neighbor cells, aided by downlink reference signal transmissions from those cells and measures the time difference of arrival of the radio frames of the measured neighbor cells relative to the serving cell. These UE measurements are then used either by the UE or by the E-SMLC to estimate the UE position using a trilateration technique.

The UE positioning protocol is an end-to-end protocol with terminations in the UE and the E-SMLC (Enhanced Serving Mobile Location Center). This protocol is called the LTE Positioning Protocol (LPP). This is a transaction-oriented protocol with exchange of LPP messages between UE and E-SMLC where one or more messages realize each transaction. A transaction results in one activity or operation such as assistance data transfer, UE positioning capability transfer or position measurement/estimate exchange. The LPP protocol is reused for SUPL, between the UE and the SLP, and is then extended by SUPL specific extensions.

There is a second positioning protocol, LPPa, with terminations in the E-UTRAN and E-SMLC that allows the exchange of information and measurements, which are useful for some specific positioning methods. Currently, the LPPa is used for the delivery of timing information that is resident only to the E-UTRAN and/or is semidynamically changing, which is required for the OTDOA positioning method. Apart from this the LPPa also supports the exchange of E-UTRAN assisted measurements that are used for the Enhanced Cell ID positioning when Enhanced Cell ID is controlled from the E-SMLC.

Figure 5:
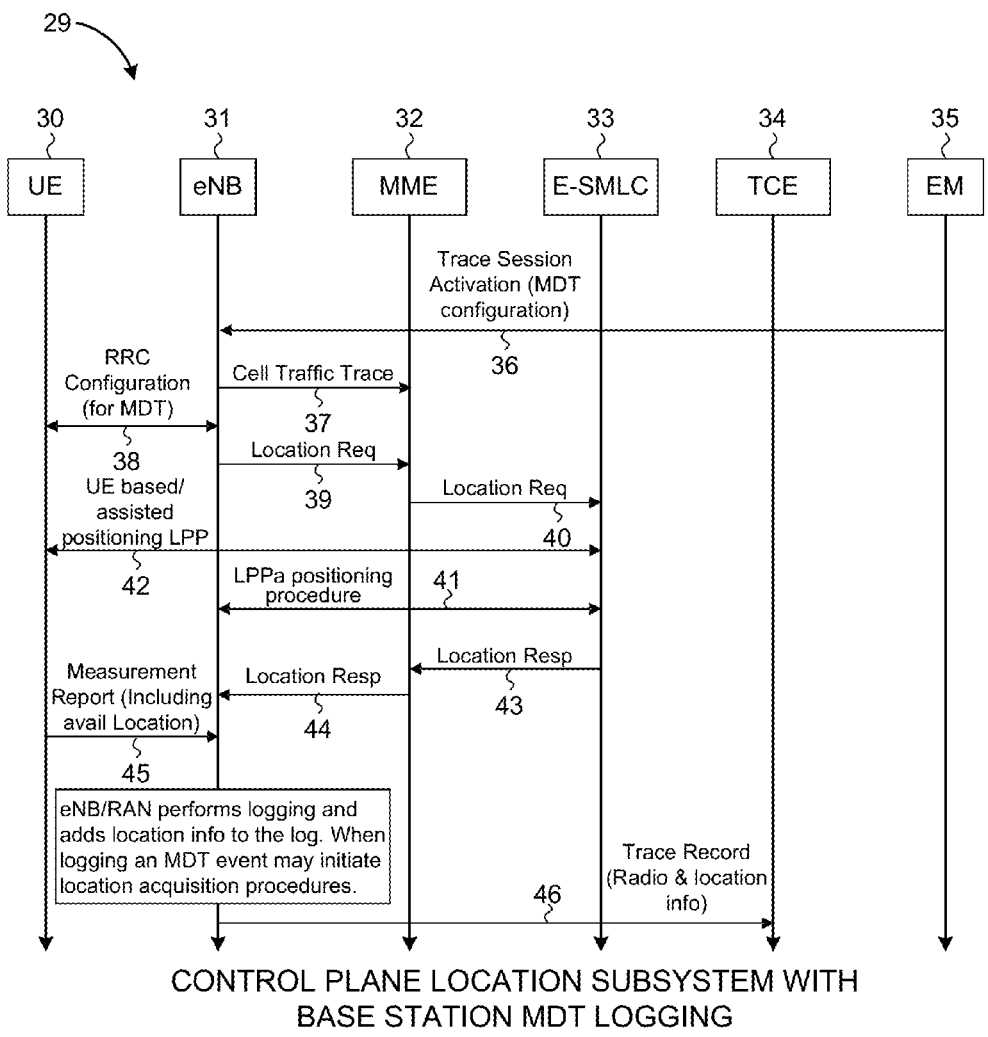
FIG. 5 illustrates a procedure for actively acquiring location information in an E-UTRAN network with base station MDT logging in accordance with one novel aspect.

FIG. 5 illustrates a procedure for actively acquiring location information in an E-UTRAN network with base station MDT logging in accordance with one novel aspect. Mobile network 29 comprises a UE 30, an base station (eNB or Radio Network Controller) 31, an Mobility Management Entity (MME) 32, an Enhanced Serving Mobile Location Center (E-SMLC) 33, a Trace Collection Entity (TCE) 34, and an Element Manager (EM) 35. The UE 30 is in direct communication with base station 31. Base station 31 communicates via MME 32 with E-SMLC 33, TCE 34, and EM 35.

The MME is the key control-node for the LTE access-network. It is responsible for idle mode UE (User Equipment) tracking and paging procedure including retransmissions. It is involved in the bearer activation/deactivation process and is also responsible for choosing the SGW for a UE at the initial attach and at time of intra-LTE handover involving Core Network (CN) node relocation. MME is also responsible for authenticating the user and in a specific embodiment provides address translation between base station 31 and E-SMLC 33, translating between temporary UE identity known by the eNB and the permanent UE identity needed to request location to the E-SMLC.

E-SMLC 33 facilitates determination of the geographical position for a UE. Input to the E-SMLC for requesting the position is a set of parameters such as PQoS (Position Quality of Service, Accuracy, Yield, Latency) requirements and information about the current radio environment of the UE.

In step 36, EM 35 communicates a trace session activation, including MDT configuration information, and request to provide location information, to base station 31. In response, bases station 31 communicates cell traffic trace to MME 32 (Step 37). In step 38, base station 31 communicates Radio Resource Control (RRC) configuration information for MDT to UE 30. FIG. 5 illustrates two methods of acquiring location information. The first method incorporates steps 39, 40, 43, and 44, and optionally steps 41 and 42 depending on the method of location selected by E-SMLC. The second method incorporates steps 41 and 42. In the first method of acquiring location information of the UE the base station 31 sends a location request to MME 32 (step 39). In step 40, MME 32 sends the location request to E-SMLC 33. Depending on location method that E-SMLC 33 selects it may use a stored location, or invoke a LPPa procedure 41, or invoke a LPP procedure 42. In response to the location request from the eNB, E-SMLC 33 sends a location response to MME 32 (Step 43). In Step 44, MME 32 sends the location response to base station 31. In the second method of acquiring location information of the UE the base station 31 performs a LPPa positioning procedure with E-SMLC through MME 32 (Step 41). In step 42, UE 30 initiates the location communication with the E-SMLC and may perform UE based or UE assisted positioning LPP with E-SMLC 33. In step 45 the UE 30 communicates the MDT report (including location information, if available) to base station 31 and base station 31 logs the MDT report. In step 46, the trace record (including radio and location information) is sent from the base station 31 to the TCE 34.

In the first method of acquiring location information, the location information is provided directly from the E-SMLC 33 to the base station 31. Therefore, the MDT report of step 45 will not include location information in the first method. Whereas in the second method of acquiring location information, the location information is provided directly from the E-SMLC 33 to the UE 30, or generated internally in the UE 30. Therefore, the MDT report of step 45 will include the location information in the second method.

Figure 6:
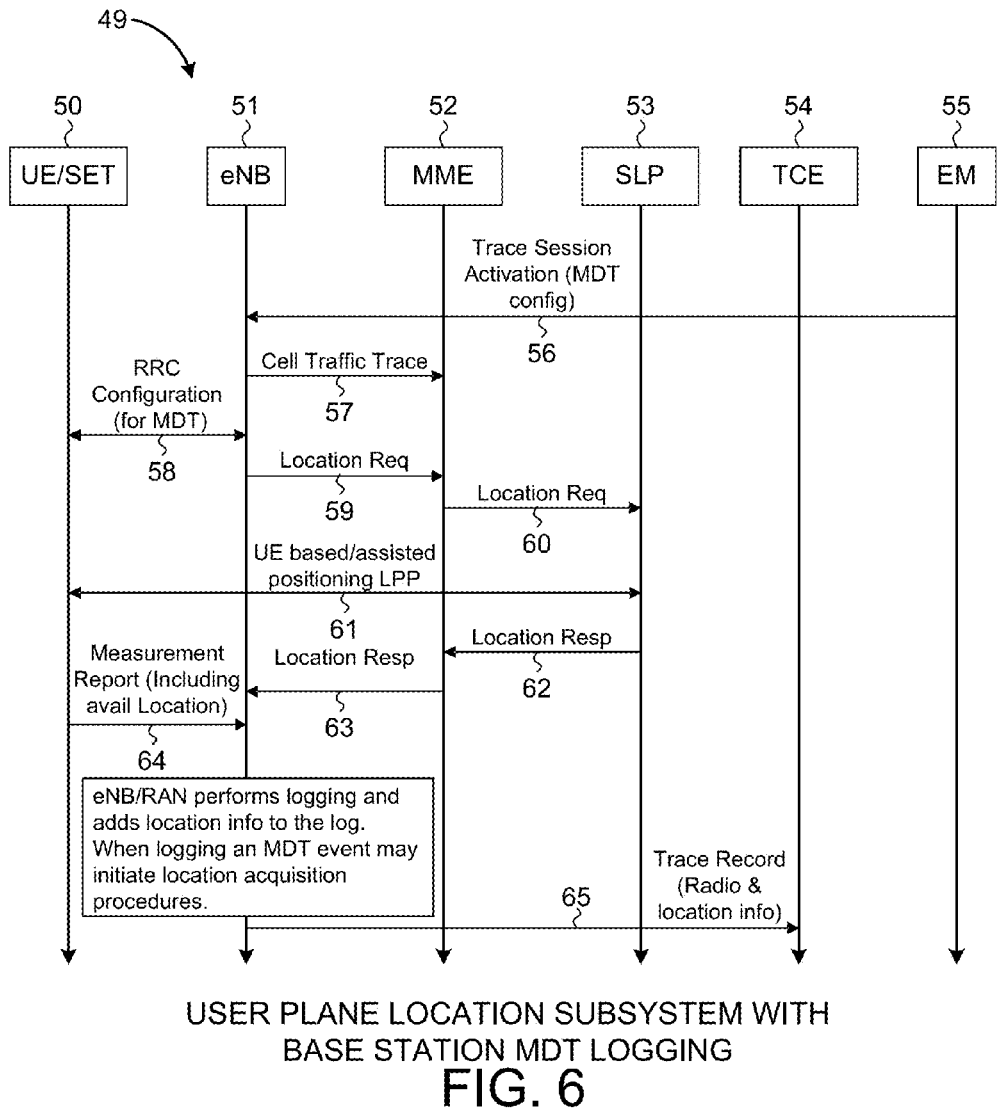
FIG. 6 illustrates a procedure for actively acquiring location information in an E-UTRAN network with base station MDT logging in accordance with one novel aspect.

FIG. 6 illustrates a procedure for actively acquiring location information in an E-UTRAN network with base station MDT logging in accordance with one novel aspect. Mobile network 49 comprises a UE/SET (Secure user plane location Enable Terminal) 50, an base station (eNB or Radio Network Controller) 51, an Mobility Management Entity (MME) 52, an Secure user plane Location Platform (SLP) 53, a Trace Collection Entity (TCE) 54, and an Element Manager (EM) 55. The UE/SET 50 is in direct communication with base station 51. Base station 51 communicates via MME 52 with SLP 53, TCE 54, and EM 55.

The MME is the key control-node for the LTE access-network. It is responsible for idle mode UE (User Equipment) tracking and paging procedure including retransmissions. It is involved in the bearer activation/deactivation process and is also responsible for choosing the SGW for a UE at the initial attach and at time of intra-LTE handover involving Core Network (CN) node relocation. MME is also responsible for authenticating the user and provides address translation between base station 51 and SLP 53.

In step 56, EM 55 communicates a trace session activation, including MDT configuration information, to base station 51. In response, base station 51 communicates cell traffic trace to MME 52 (Step 57). In step 58, base station 51 communicates Radio Resource Control (RRC) configuration information for MDT to UE/SET 50. FIG. 6 illustrates two methods of acquiring location information. The first method incorporates steps 59, 60, 61, 62, and 63. The second method incorporates steps 61 and the location information in 64. In the first method of acquiring location information of the UE/SET 50 the base station 51 sends a location request to MME 52 (step 59). In step 60, MME 52 sends the location request to SLP 53. SLP the uses LPP procedures to determine the UE location in step 61. In response to the location request, SLP 53 sends a location response to MME 52 (Step 62). In Step 63, MME 52 sends the location response to base station 51. In the second method of acquiring location information of the UE/SET 50, UE/SET 50 performs UE based assisted positioning LPP with SLP 53 (Step 61). In step 64, the UE/SET 50 communicates the MDT report (including location information, if available) to base station 51 and the base station 51 logs the MDT report. In step 65 the trace record (including radio and location information) is sent from the base station 51 to the TCE 54.

In the second method of acquiring location information, the location information is provided directly from the SLP 53 to the base station 51. Therefore, the MDT report of step 64 will not include location information in the second method. Whereas in the first method of acquiring location information, the location information is provided directly from the SLP 53 to the UE/SET 50. Therefore, the MDT report of step 64 will include the location information in the first method.

Figure 7:
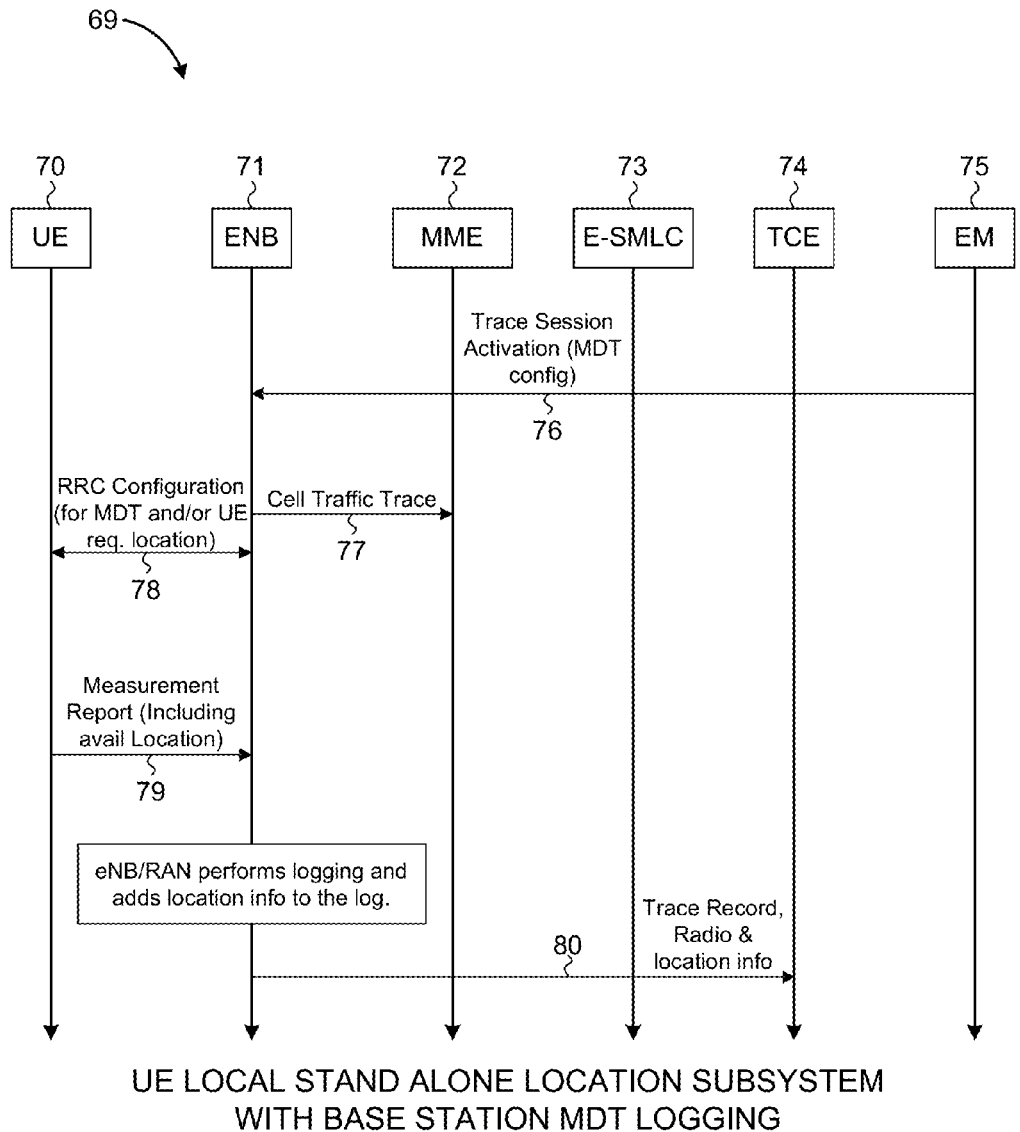
FIG. 7 illustrates a procedure for actively acquiring location information in an E-UTRAN network with base station MDT logging in accordance with one novel aspect.

FIG. 7 illustrates a procedure for actively acquiring location information in an E-UTRAN network with base station MDT logging in accordance with one novel aspect. Mobile network 69 comprises a UE 70, an base station (eNB or Radio Network Controller) 71, an Mobility Management Entity (MME) 72, an Enhanced Serving Mobile Location Center (E-SMLC) 73, a trace collection entity (TCE) 74, and an Element Manager (EM) 75. The UE 70 is in direct communication with base station 71. Base station 71 communicates via MME 72 with E-SMLC 73, TCE 74, and EM 75.

The MME is the key control-node for the LTE access-network. It is responsible for idle mode UE (User Equipment) tracking and paging procedure including retransmissions. It is involved in the bearer activation/deactivation process and is also responsible for choosing the SGW for a UE at the initial attach and at time of intra-LTE handover involving Core Network (CN) node relocation. MME is also responsible for authenticating the user and provides address translation between base station 71 and E-SMLC 73.

E-SMLC 73 facilitates determination of the geographical position for a UE. Input to the E-SMLC for requesting the position is a set of parameters such as PQoS (Position Quality of Service, Accuracy, Yield, Latency) requirements and information about the current radio environment of the UE.

In step 76, EM 75 communicates a trace session activation, including MDT configuration information, to base station 71. In response, base station 71 communicates cell traffic trace to MME 72 (Step 77). In step 78, base station 71 communicates Radio Resource Control (RRC) configuration information for MDT to UE 70, which would typically be a UE measurement configuration. In step 78 the base station 71 also communicates a request for the UE to attempt to actively acquire location information, to be reported with the measurement report. In response, UE 70 determines if, when and how the location information is to be acquired. If the UE battery power is low, the UE may decide to not attempt any acquisition of location information. If the UE has insufficient memory to store MDT information, the UE may not attempt to acquire the location information. If the UE determines that location information will be acquired, the UE may choose one of the multiple location acquisition systems described above with respect to FIGS. 3 and 4, such as GNSS or OTDOA. In step 79 the UE 70 communicates the MDT report (including location information, if available) to base station 71 and base station 71 logs the MDT report. In step 80, the trace record (including radio and location information) is sent from the base station 71 to the TCE 74.

Figure 8:
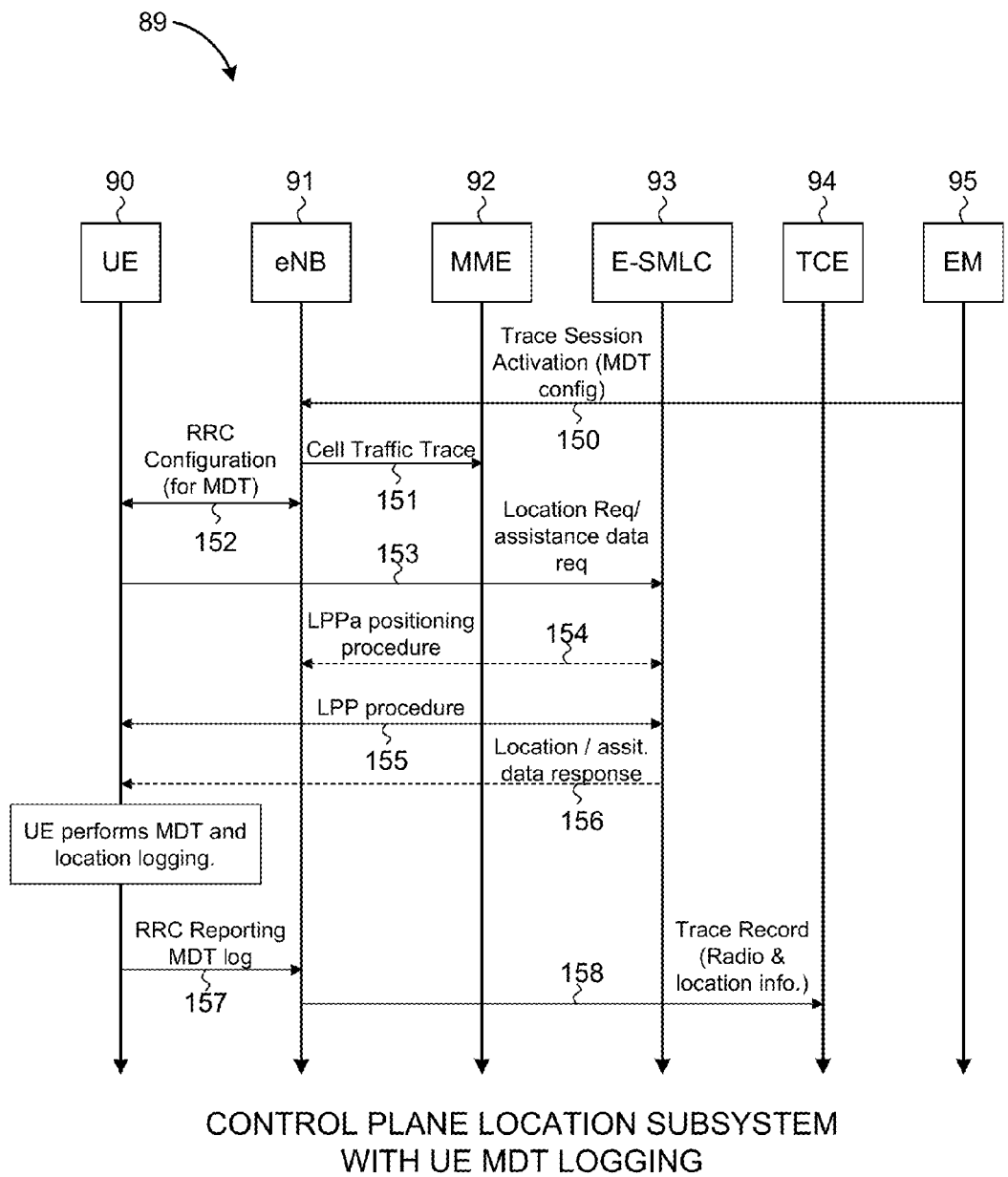
FIG. 8 illustrates a procedure for actively acquiring location information in an E-UTRAN network with UE MDT logging in accordance with one novel aspect.

FIG. 8 illustrates a procedure for actively acquiring location information in an E-UTRAN network with UE MDT logging in accordance with one novel aspect. Mobile network 89 comprises a UE 90, an base station (eNB or Radio Network Controller) 91, an Mobility Management Entity (MME) 92, an Enhanced Serving Mobile Location Center (E-SMLC) 93, a Trace collection entity (TCE) 94, and an Element Manager (EM) 95. The UE 90 is in direct communication with base station 91. Base station 91 communicates via MME 92 with E-SMLC 93, TCE 94, and EM 95.

The MME is the key control-node for the LTE access-network. It is responsible for idle mode UE (User Equipment) tracking and paging procedure including retransmissions. It is involved in the bearer activation/deactivation process and is also responsible for choosing the SGW for a UE at the initial attach and at time of intra-LTE handover involving Core Network (CN) node relocation. MME is also responsible for authenticating the user and provides address translation between base station 91 and E-SMLC 93.

E-SMLC 93 facilitates determination of the geographical position for a UE. Input to the E-SMLC for requesting the position is a set of parameters such as PQoS (Position Quality of Service, Accuracy, Yield, Latency) requirements and information about the current radio environment of the UE.

In step 150, EM 95 communicates a trace session activation, including MDT configuration information, to base station 91. In response, bases station 31 communicates cell traffic trace to MME 92 (Step 151). In step 152, base station 91 communicates Radio Resource Control (RRC) configuration information for MDT to UE 90. FIG. 8 illustrates two methods of acquiring location information. The first method incorporates steps 153, 154, 155 and 156. The second method incorporates steps 155. In the first method of acquiring location information of the UE 90, UE 90 sends a location request to E-SMLC 93 (step 153). The E-SMLC then determines UE location by using stored UE location information, or by performing one or several LPPa positioning procedures in step 154, or by performing a LPP positioning procedure in step 155, or a combination thereof. In response to the location request, E-SMLC 93 sends a location response to UE 90. In case the UE has already been informed of its location in the LPP positioning procedure in step 155, the location response may be omitted. In the second method of acquiring location information of the UE the E-SMLC only act as a supporting node to the UE. In step 155, UE 90 performs a LLP procedure with E-SMLC 93 resulting in acquisition of positioning assistance information by UE 90. Based on assistance information and UE positioning features, the UE then internally calculated the location. UE 90 then stores the MDT report (with location information if available) in a memory located within the UE 90. After creating a log of MDT reports, In step 157 the UE 90 communicates the MDT log including multiple MDT reports (including location information, if available) to base station 91. In step 158, the trace record (including radio and location information) is sent from the base station 91 to the TCE 94.

In both the first and second methods of acquiring location information, the location information is either provided from the E-SMLC 93 to the UE 90, or calculated internally in the UE. Therefore, the communication of the MDT log of step 157 will include the location information for both methods.

Figure 9:
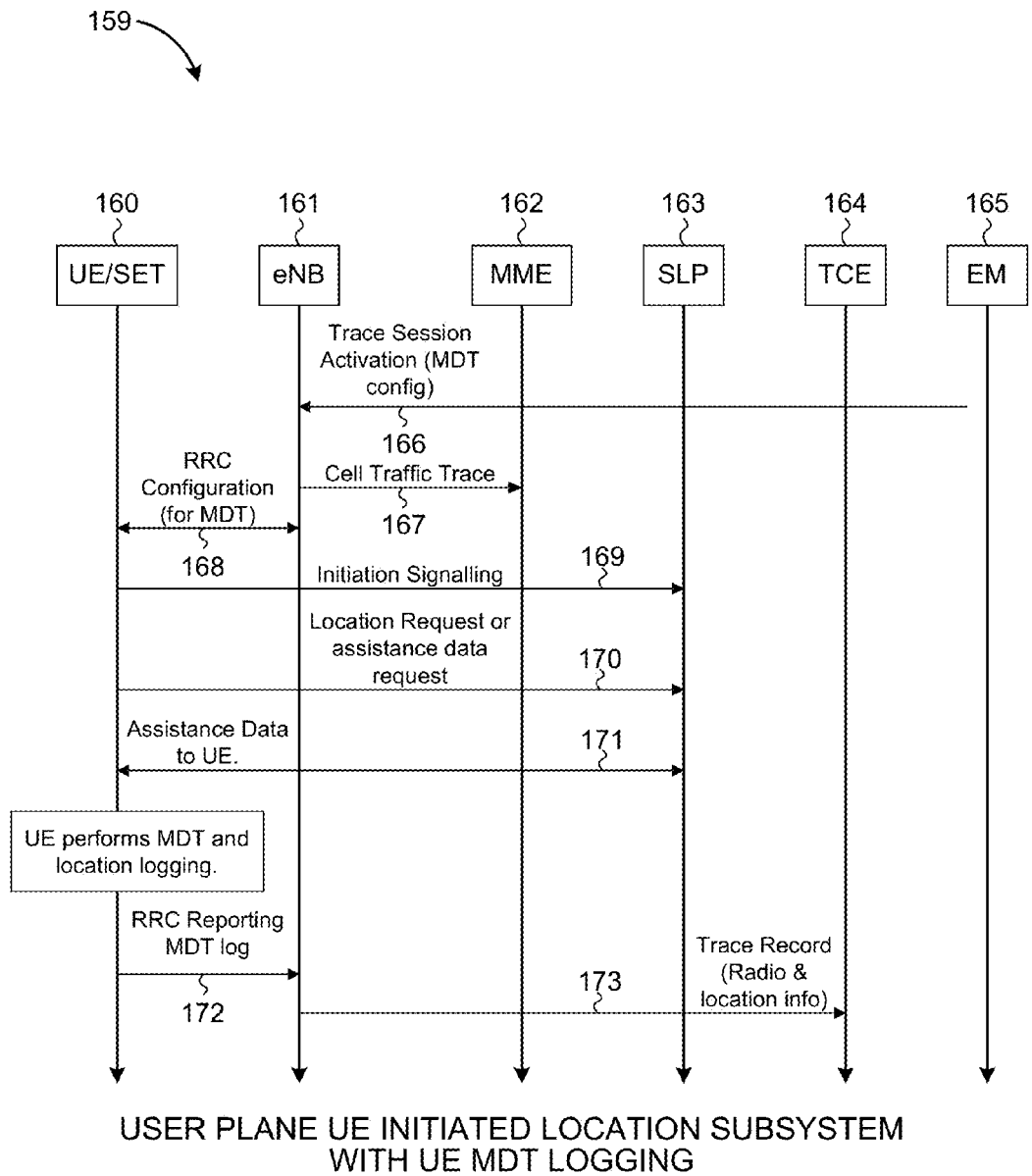
FIG. 9 illustrates a procedure for actively acquiring location information in an E-UTRAN network with UE MDT logging in accordance with one novel aspect.

FIG. 9 illustrates a procedure for actively acquiring location information in an E-UTRAN network with UE MDT logging in accordance with one novel aspect. Mobile network 159 comprises a UE/SET (Secure user plane location Enable Terminal) 160, an base station (eNB or Radio Network Controller) 161, an Mobility Management Entity (MME) 162, an Secure user plane Location Platform (SLP) 163, a Trace Collection Entity (TCE) 164, and an Element Manager (EM) 165. The UE/SET 160 is in direct communication with base station 51. Base station 161 communicates via MME 162 with SLP 163, TCE 164, and EM 165.

The MME is the key control-node for the LTE access-network. It is responsible for idle mode UE (User Equipment) tracking and paging procedure including retransmissions. It is involved in the bearer activation/deactivation process and is also responsible for choosing the SGW for a UE at the initial attach and at time of intra-LTE handover involving Core Network (CN) node relocation. MME is also responsible for authenticating the user and provides address translation between base station 161 and SLP 163.

In step 166, EM 165 communicates a trace session activation, including MDT configuration information, to base station 161. In response, bases station 161 communicates cell traffic trace to MME 162 (Step 167). In step 168, base station 161 communicates Radio Resource Control (RRC) configuration information for MDT to UE/SET 160.

There are two methods of acquiring location information illustrated in FIG. 9. In the first method, a location request is sent from UE 160 to SLP 163 (Step 170). Then in response, the SLP 163 sends a location response to UE 160 in step 171.

In the second method, an assistance data request is sent by UE 160 to SLP 163 (step 170). In response, SLP 163 sends to UE 160 the requested assistance data (step 171). Upon receiving the requested assistance data, UE 160 determines the location information. UE 160 then logs the MDT information and the location information (if available) in memory located within UE 160.

In step 172, the UE/SET 160 communicates the MDT log (including multiple MDT reports) to base station 161. In step 173 the trace record (including radio and location information) is sent from the base station 161 to the TCE 164.

In both the first and second methods of acquiring location information, the location information is provided directly from the SLP 163 to the UE 160. Therefore, the communication of the MDT log of step 172 will include the location information for both methods.

Figure 10:
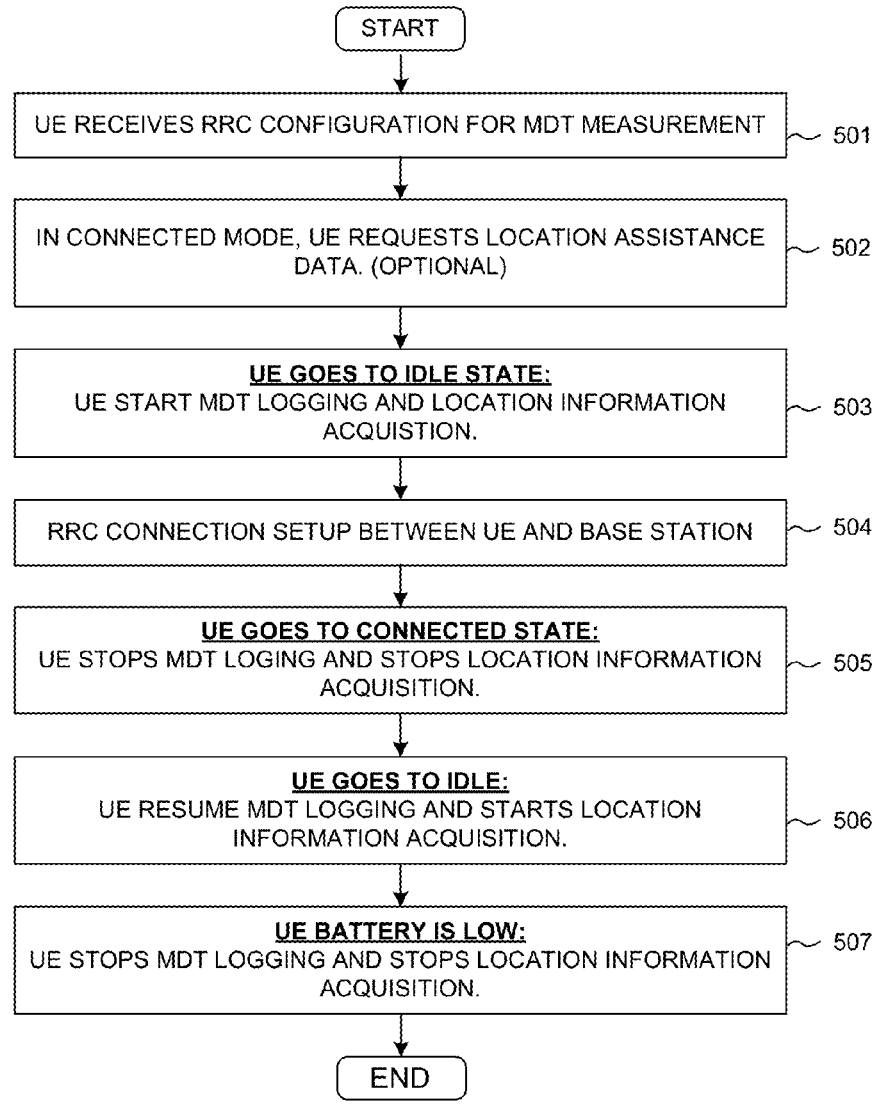
FIG. 10 is a flowchart of UE MDT logging in Idle mode with active location when the UE switches between connected and idle mode and when the UE encounters a low battery event.

A FIG. 10 is a flowchart of a MDT logging procedure when the UE switches between connected and Idle mode and encounters a low battery event. A network comprises a UE and a base station (eNB or RAN). In step 501, the UE receives an RRC configuration for MDT measurement. In one embodiment, the UE responds by requesting location assistance data (step 502). In another embodiment, the UE does not request location assistance data. In step 503, the UE enters an idle state and begins MDT logging and location information acquisition. Then an RRC connection is setup between the UE and the base station (step 504). In step 505, the UE enters a connected state and stops both MDT logging and location information acquisition. The UE then returns to an idle state and resumes both MDT logging and location information acquisition (step 506). In step 507, the UE battery is in a low energy state and the UE stops both MDT logging and location information acquisition.

Figure 11:
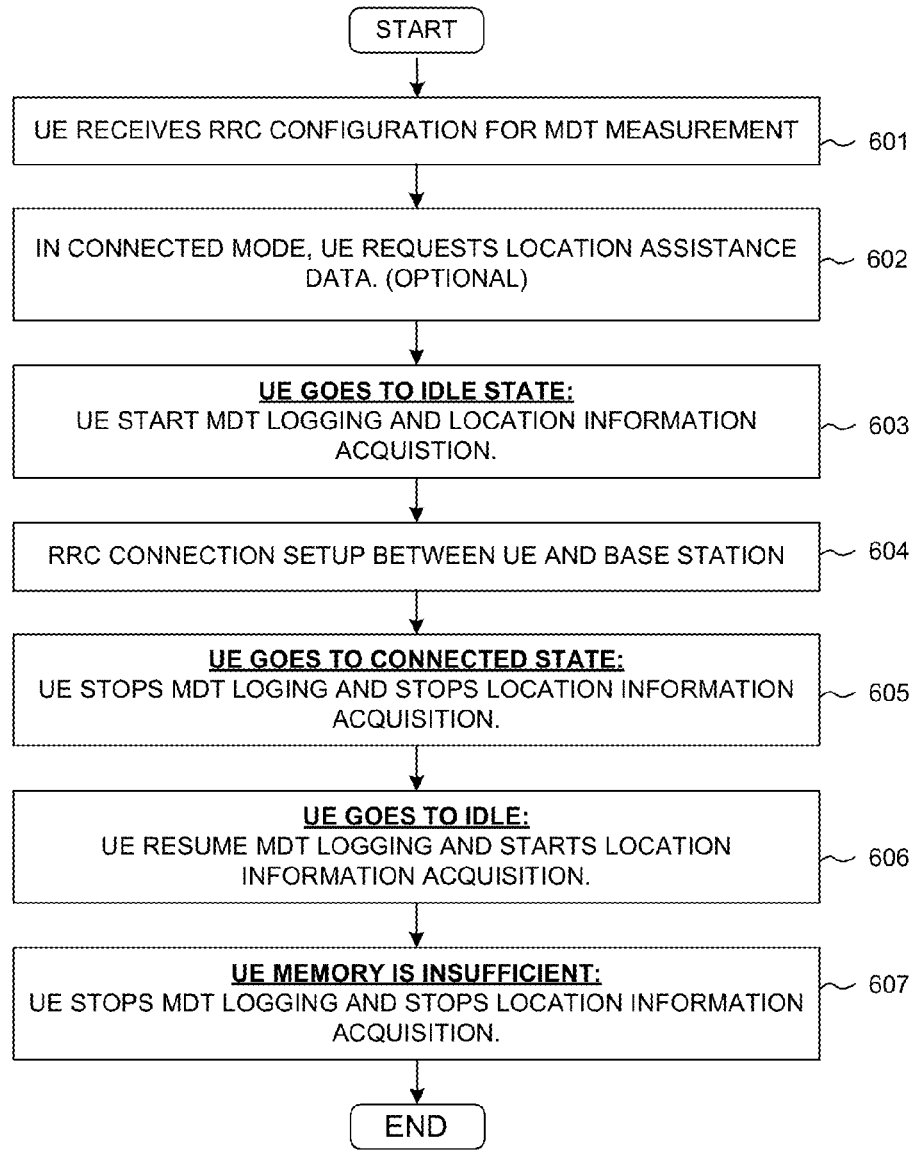
FIG. 11 is a flowchart of UE MDT logging in Idle mode with active location when the UE switches between connected and idle mode and when the UE encounters an insufficient memory event.

FIG. 11 is a flowchart of a MDT logging procedure when the UE switches between connected and Idle mode and encounters an insufficient memory event. A network comprises a UE and a base station (eNB or RAN). In step 601, the UE receives an RRC configuration for MDT measurement. In one embodiment, the UE responds by requesting location assistance data (step 602). In another embodiment, the UE does not request location assistance data. In step 603, the UE enters an idle state and begins MDT logging and location information acquisition. Then an RRC connection is setup between the UE and the base station (step 604). In step 605, the UE enters a connected state and stops both MDT logging and location information acquisition. The UE then returns to an idle state and resumes both MDT logging and location information acquisition (step 606). In step 607, the available memory in the UE becomes insufficient and the UE stops both MDT logging and location information acquisition.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   (a) communicating a measurement collection request onto a device;
   (b) determining if and how a location information is to be acquired;
   (c) acquiring a measurement information and the location information;
   (d) storing the measurement information and the location information in a measurement log, wherein (c) and (d) are performed by the device; and
   (e) suspending the acquisition of measurement information and the acquisition of location information when a local resource is not available, wherein the step of (c) further comprises:
      (c1) enabling a location acquisition system, wherein the enabling of (c1) is performed by the device, wherein the location acquisition system generates the location information, wherein the location acquisition system is Global Navigation Satellite System (GNSS) or Observed Time Difference of Arrival System (OTDOA), and wherein location information is generated in accordance with a LTE positioning protocol (LTP).

2. The method of claim 1, wherein the suspending of (e) is also performed when the device determines that the location information is not to be acquired.

3. The method of claim 1, wherein the device is a User Equipment (UE).

4. The method of claim 1, wherein the device is a Base Station (BS).

5. The method of claim 1, wherein the suspending of (e) further comprises disabling a location acquisition system, and wherein the location acquisition system generates the location information.

6. The method of claim 1, wherein the measurement log is a Minimization of Drive Test (MDT) log.

7. The method of claim 1, further comprising:
   (f) disabling a location acquisition system, wherein (e) and (f) are performed by the device, and wherein the location acquisition system generates the location information.

8. The method of claim 7, wherein the suspending of (e) is initiated when the device has insufficient memory to store the requested measurement.

9. The method of claim 7, wherein the suspending of (e) is initiated when the device is in a low battery mode.

10. The method of claim 1, wherein the device is a base station, wherein the determining of (b) is performed by the base station.

11. The method of claim 1, wherein the device is a base station, wherein a location acquisition system resides in a User Equipment (UE), and wherein a request to obtain a detailed location information is sent from the base station to the UE, thereby requesting the UE to attempt to make the detailed location information available.

12. The method of claim 11, wherein a MDT measurement system resides in the User Equipment (UE), wherein the UE is configured to communicate a measurement report including the location information to the base station, wherein the UE attempts to have the detailed location information available when communicating the measurement report.

13. The method of claim 1, wherein the device is a User Equipment (UE).

14. The method of claim 1, wherein the device is a User Equipment (UE), and wherein the location information is generated by a location server.

15. The method of claim 1, wherein the device is a base station, wherein the location information is generated by a location server, and wherein a Mobile Management Entity (MME) performs address translation of a location request and a location response communicated between the base station and the location server.

16. The method of claim 15, wherein the location server is a Secure user plane Location Platform (SLP) or an Evolved Serving Mobile Location Center (E-SMLC).

* * * * *